(12) United States Patent
Quan et al.

(10) Patent No.: US 10,187,871 B2
(45) Date of Patent: Jan. 22, 2019

(54) PAGING METHOD AND DEVICE FOR NETWORK AND TERMINAL

(71) Applicant: China Academy of Telecommunications Technology, Beijing (CN)

(72) Inventors: Haiyang Quan, Beijing (CN); Huiying Zhang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 87 days.

(21) Appl. No.: 14/760,946

(22) PCT Filed: Jan. 16, 2014

(86) PCT No.: PCT/CN2014/070727
§ 371 (c)(1),
(2) Date: Jul. 14, 2015

(87) PCT Pub. No.: WO2014/111029
PCT Pub. Date: Jul. 24, 2014

(65) Prior Publication Data
US 2016/0029343 A1    Jan. 28, 2016

(30) Foreign Application Priority Data

Jan. 18, 2013    (CN) .......................... 2013 1 0018651

(51) Int. Cl.
*G06F 1/32*    (2006.01)
*H04W 28/18*    (2009.01)
(Continued)

(52) U.S. Cl.
CPC .......... *H04W 68/02* (2013.01); *G06F 1/3278* (2013.01); *H04W 28/18* (2013.01); *H04W 88/02* (2013.01);
(Continued)

(58) Field of Classification Search
CPC .............................. H04W 68/02; H04W 28/18
(Continued)

(56) References Cited

U.S. PATENT DOCUMENTS 8,160,618 B2    4/2012    Harris et al.
2010/0067515 A1    3/2010    Chin et al.
(Continued)

FOREIGN PATENT DOCUMENTS

CN    101043721    9/2007
CN    101453788    6/2009
(Continued)

OTHER PUBLICATIONS

International Search Report for PCT/CN2014/070727 dated Jul. 2, 2014.

*Primary Examiner* — Vladimir Magloire
*Assistant Examiner* — Donald H B Braswell
(74) *Attorney, Agent, or Firm* — Foley & Lardner LLP

(57) ABSTRACT

The embodiments of the present invention provide a paging method and device for a network and a terminal, for avoiding the paging period limit of the system frame number (SFN), configuring a longer paging period for the terminal, and conserving terminal power consumption. The method comprises: determining that the current time is a time for transmitting a paging message, the time for transmitting a paging message being predetermined with the coordination of the standard time used by the terminal; transmitting the paging message to the terminal.

7 Claims, 3 Drawing Sheets

(51) Int. Cl.
*H04W 68/02* (2009.01)
*H04W 88/02* (2009.01)

(52) U.S. Cl.
CPC ............ *Y02D 10/157* (2018.01); *Y02D 70/00* (2018.01); *Y02D 70/1242* (2018.01); *Y02D 70/1262* (2018.01); *Y02D 70/164* (2018.01); *Y02D 70/21* (2018.01); *Y02D 70/24* (2018.01)

(58) Field of Classification Search
USPC .......................................................... 455/458
See application file for complete search history.

(56) References Cited

U.S. PATENT DOCUMENTS

| 2010/0248752 | A1* | 9/2010 | Yu | H04W 68/02 |
| | | | | 455/458 |
| 2012/0294173 | A1* | 11/2012 | Su | H04W 24/10 |
| | | | | 370/252 |
| 2012/0300655 | A1* | 11/2012 | Lee | H04W 24/00 |
| | | | | 370/252 |
| 2014/0314037 | A1* | 10/2014 | Yoshizawa | H04W 52/0216 |
| | | | | 370/329 |

FOREIGN PATENT DOCUMENTS

| CN | 101730154 | 6/2010 |
| EP | 2 234 447 A2 | 9/2010 |

* cited by examiner

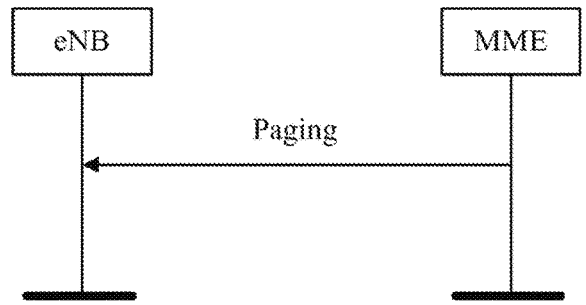

Fig. 1

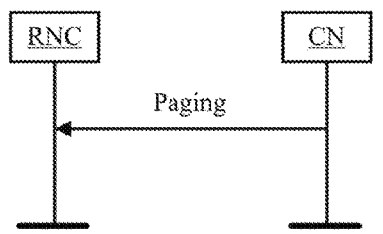

Fig. 2

```
determining, by a network side device, configuration parameters
relating to a time for starting to transmit a paging message
according to negotiation with a terminal using standard time, where
the configuration parameters relating to the time for starting to
transmit the paging message include T1, N, P1, and S, whereT1
represents a start time of a radio frame incorporating the paging
message, N represents an integer greater than -1, S represents an
offset of the paging message in the radio frame, and P1 represents a
transmission cycle of the paging message
```
— S101

```
calculating, by the network side device, the time for starting to
transmit the paging message as T1+N*P1+S
```
S101 (continued)

```
transmitting, by the network side device, the paging message to the
terminal at the time for starting to transmit the paging message
```
S102

Fig. 3

PAGING METHOD AND DEVICE FOR NETWORK AND TERMINAL

This application is a US National Stage of International Application No. PCT/CN2014/070727, filed on Jan. 16, 2014, designating the United States, and claiming the benefit of Chinese Patent Application No. 201310018651.9, filed with the State Intellectual Property Office of People's Republic of China on Jan. 18, 2013 and entitled "Paging method and device for network and terminal", which is hereby incorporated by reference in its entirety.

FIELD

The present invention relates to the field of mobile communications and particularly to a paging method and device at a network side and a terminal.

BACKGROUND

From the perspective of the radio network side, there are two states, i.e., the RRC_connected state and the RRC_idle state, of a terminal in a Long Term Evolution (LTE) system; and in a Universal Mobile Telecommunication System (UMTS) there are five states of a terminal, i.e., CELL_DCH, CELL_FACH, CELL_PCH/URA_PCH, and Idle states, where CELL_DCH, CELL_FACH, and CELL_PCH/URA_PCH belongs to the RRC_connected state, and only the terminal in the RRC_connected state can transmit uplink data. Once the terminal completes the transmission of data, the network side releases the RRC connection of the terminal in a Radio Resource Control (RRC) Connection Release message upon detecting that the terminal has no data transmitted for a long period of time, so that the terminal enters the RRC_idle state.

The terminal in the idle state primarily operates to detect paging by the network side. In order to save power, the terminal generally detects paging in a Discontinuous Reception (DRX) mode in which the terminal is in a receiving state only for a short period of time in each cycle and in a non-receiving state in the remaining period of time in the cycle. In the UMTS system, the length of time of a DRX cycle configured at the network side at present is at most $2^9$ radio frames length (i.e. 5120 ms), that is, from the perspective of DRX in the UMTS system, the terminal enables a receiver at most once every 5120 ms to receive a paging instruction message, and possibly a paging message, of the network side but disables the receiver in the remaining period of time. The longest DRX cycle configured at the network side at present in the LTE system is 2560 ms.

There are possibly two DRX lengths configured for the terminal in both the UMTS system and the LTE system: one is configured by a Radio Network Controller (RNC)/evolved Node B (eNB) in a System Information Block (SIB) message and can be referred to a default DRX, which is applicable to all of terminals camping on the cell. The other is negotiated by a Core Network (CN) entity and the terminal in a Non-Access Stratum (NAS) procedure and can be referred to a User Equipment (UE) specific DRX, which is only applicable to a single terminal. The latter one is unknown to the RNC/eNB in the negotiation procedure.

The paging message is firstly transmitted by the core network to the access network, i.e., the RNC (UMTS)/eNB (LTE), and in the LTE system, transmitted by a core network entity, i.e., a Mobility Management Entity (MME), via an S1 interface as illustrated in FIG. 1; and in the UMTS system via an Iu interface, as illustrated in FIG. 2. If the paging message carries the UE specific DRX configuration, then in the UMTS system, the RNC transmits the paging message via the air interface using a DRX parameter configured in the paging message; or in the LTE system, the eNB compares the DRX parameter in the DRX configuration with a DRX parameter configured in a system message and transmits the paging message using the shorter one of the DRX cycles.

As specified in the 36.304 protocol in the LTE system, and the 25.304 protocol in the UMTS system, it is determined that there is a direct relationship between the calculation of the occasion at which the UE receives paging and a System Frame Number (SFN) and an International Mobile Subscriber identity (IMSI). Taking the UMTS system as an example, it is specified in the 25.304 protocol that Paging Occasion={(IMSI div K) mod (DRX cycle length div PBP) }*PBP+n*DRX cycle length+Frame Offset, n=0, 1, 2, . . . , as long as the SFN is below its maximum value, where K represents a coefficient of the DRX cycle length, the DRX cycle length represents the length of the DRX cycle, PBP represents the cycle of a paging block, the Frame Offset represents a frame offset, and n ranges from 0 to the maximum value of the SFN. Apparently the value of n is limited to the maximum value of the SFN, so the paging cycle in the UMTS system is also limited to the maximum value of the SNF. This will also apply to the LTE system.

Moreover time information is exchanged as defined below in the existing protocol: in the LTE system, detailed time information can be provided in the SIB 16 in the 36.331 protocol; and in the UMTS system, time information can be available at present from Multimedia Broadcast Multicast Service (MBMS) information of Least-Cost Route (LCR) Time Division Duplex (TDD), and this network standard time is only used for an MBMS service but has not been applicable to other functions. In the LTE system, this time can be provided for use by a higher layer in a Code Division Multiple Access 2000 (CDMA 2000) system and can also be applicable to positioning, Minimization of Drive Test (MDT) and an MBMS.

Machine-Type Communication (MTC), which is a new communication concept, is intended to integrate a number of different types of communication technologies together, e.g., machine-to-machine communication, machine controlled communication, human-to-machine interactive communication, mobile Internet communication, etc., to thereby develop social production and life styles. As expected, human-to-human communication services will account for only one third of the terminal markets in the future, whereas a larger amount of communication will emerge as MTC communication services. Sometimes MTC communication is also referred to as Machine-to-Machine (M2M) communication or the Internet of Things.

An important issue of power saving needs to be considered in the MTC communication scenario. In some scenarios, the lifetime of an MTC device is determined directly by the lifetime of a battery, for example, an MTC device for tracking an animal or an MTC device for hydrologic supervision, for both of which it is nearly impossible to replace batteries, so the MTC device is required to consume an extremely low amount of power.

The longest existing paging cycle will not exceed the maximum length of the SFN, but in fact, even the longest DRX cycle may result in too frequency operations, particularly for an MTC terminal which only communicates occasionally with the network, so it is not good for the terminal saving power.

SUMMARY

Embodiments of the invention provide a paging method and device at the network side and at a terminal so as to avoid a paging cycle from being limited by a System Frame Number (SFN) and to configure the terminal with a longer paging cycle and save power consumption of the terminal.

An embodiment of the invention provides a paging method at the network side, the method including:

determining a current time as a transmission time of a paging message, wherein the transmission time of the paging message is predetermined as a result of negotiation with a terminal using a standard time; and transmitting the paging message to the terminal.

Preferably before the transmission time of the paging message is determined as a result of negotiation with the terminal using the standard time, the method further includes:

transmitting a message for determining the standard time to the terminal in a preset system information block.

Preferably the standard time is a system time of a communication system, or a network standard time.

Preferably determining the transmission time of the paging message as a result of negotiation with the terminal using the standard time includes:

determining configuration parameters related to the transmission time of the paging message as a result of negotiation with the terminal using the standard time; and calculating the transmission time of the paging message from the configuration parameters.

Preferably the configuration parameters include a radio frame corresponding to an initiation time of the paging message, an offset of the paging message in the radio frame, and a first transmission cycle of the paging message.

Preferably the configuration parameters further include the number of times that the paging message is repeated in each first transmission cycle, and a repetition cycle of the paging message in each first transmission cycle.

Preferably the configuration parameters further include the number of times that the paging message is repeated in each first transmission cycle;

wherein times when the paging message is transmitted repeatedly in each first transmission cycle are determined from an International Mobile Subscriber Identity (IMSI) of the terminal, and a System Frame Number (SFN).

Preferably the first transmission cycle of the paging message is more than preset value.

An embodiment of the invention provides a paging method at a terminal, the method including:

determining a current time as a reception time of a paging message, wherein the reception time of the paging message is predetermined as a result of negotiation with the network side using a standard time; and receiving the paging message transmitted by the network side.

Before the reception time of the paging message is determined as a result of negotiation with the network side using the standard time, the method further includes:

receiving a message, for determining the standard time, transmitted by the network side in a preset system information block.

Preferably the standard time is a system time of a communication system, or a network standard time.

Preferably determining the reception time of the paging message as a result of negotiation with the network side using the standard time includes:

determining configuration parameters related to the reception time of the paging message as a result of negotiation with the network side using the standard time; and calculating the reception time of the paging message from the configuration parameters.

Preferably the configuration parameters include:

a radio frame corresponding to an initiation time of the paging message, an offset of the paging message in the radio frame, and a first transmission cycle of the paging message.

Preferably the configuration parameters further include the number of times that the paging message is repeated in each first transmission cycle, and a repeation cycle of the paging message in each first transmission cycle.

Preferably the configuration parameters further include the number of times that the paging message is repeated in each first transmission cycle;

wherein times when the paging message is transmitted repeatedly in each first transmission cycle are determined from an IMSI of the terminal, and an SFN.

An embodiment of the invention provides a paging device at the network side, the device including:

a paging time determining unit configured to predetermine a transmission time of a paging message as a result of negotiation with a terminal using a standard time;

a current time determining unit configured to determine a current time as the transmission time of the paging message; and a paging transmitting unit configured to transmit the paging message to the terminal.

The device further includes:

a standard time synchronizing unit configured to transmit a message for determining the standard time to the terminal in a preset system information block before the paging time determining unit determines the transmission time of the paging message as a result of negotiation with the terminal using the standard time.

Preferably the standard time is a system time of a communication system, or a network standard time.

Preferably the paging time determining unit includes:

a configuration parameter determining unit configured to determine configuration parameters related to the transmission time of the paging message as a result of negotiation with the terminal using the standard time; and a configuration parameter calculating unit configured to calculate the transmission time of the paging message from the configuration parameters.

Preferably the configuration parameters include:

a radio frame corresponding to an initiation time of the paging message, an offset of the paging message in the radio frame, and a first transmission cycle of the paging message.

Preferably the configuration parameters further include the number of times that the paging message is repeated in each first transmission cycle, and a repeation cycle of the paging message in each first transmission cycle.

Preferably the configuration parameters further include the number of times that the paging message is repeated in each first transmission cycle;

wherein times when the paging message is transmitted repeatedly in each first transmission cycle are determined from an IMSI of the terminal, and an SFN.

Preferably the first transmission cycle of the paging message is more than a preset value.

An embodiment of the invention further provides a paging device at the network side, including a processor and a data transceiving interface, wherein:

the processor is configured to predetermine a transmission time of a paging message as a result of negotiation with a terminal using a standard time; to determine a current time as the transmission time of the paging message; and to transmit the paging message to the terminal; and the data transceiving interface is configured to be controlled by the processor to transmit and receive data.

An embodiment of the invention provides a paging device at a terminal, the device including:

a paging time determining unit configured to predetermine a reception time of a paging message as a result of negotiation with the network side using a standard time;

a current time determining unit configured to determine a current time as the reception time of the paging message; and a paging receiving unit configured to receive the paging message transmitted by the network side.

The device further includes:

a standard time synchronizing unit configured to receive a message, for determining the standard time, transmitted by the network side in a preset system information block before the paging time determining unit determines the reception time of the paging message as a result of negotiation with the network side using the standard time.

Preferably the standard time is a system time of a communication system, or a network standard time.

Preferably the paging time determining unit includes:

a configuration parameter determining unit configured to determine configuration parameters related to the reception time of the paging message as a result of negotiation with the network side using the standard time; and a configuration parameter calculating unit configured to calculate the reception time of the paging message from the configuration parameters.

Preferably the configuration parameters includes:

a radio frame corresponding to an initiation time of the paging message, an offset of the paging message in the radio frame, and a first transmission cycle of the paging message.

Preferably the configuration parameters further include the number of times that the paging message is repeated in each first transmission cycle, and a repetition cycle of the paging message in each first transmission cycle.

Preferably the configuration parameters further include the number of times that the paging message is repeated in each first transmission cycle;

wherein times when the paging message is transmitted repeatedly in each first transmission cycle are determined from an IMSI of the terminal, and an SFN.

An embodiment of the invention further provides a paging device at a terminal, the device including a processor and a data transceiving interface, wherein:

the processor is configured to predetermine a reception time of a paging message as a result of negotiation with the network side using a standard time; to determine a current time as the reception time of the paging message; and to receive the paging message transmitted by the network side; and the data transceiving interface is configured to be controlled by the processor to transmit and receive data.

As can be apparent from the technical solutions above, in the embodiments of the invention, the current time is determined as a transmission time of a paging message, where the transmission time of the paging message is predetermined as a result of negotiation with a terminal using a standard time; and the paging message is transmitted to the terminal. As compared in the existing protocol in which a paging time is calculated from an SFN, the invention determines a paging time as a result of negotiation based upon the standard time to thereby avoid the paging time from being limited to the maximum value of the SNF so as to configure the terminal with a longer paging cycle for the purpose of saving power of the terminal.

BRIEF DESCRIPTION OF THE DRAWINGS

FIG. 1 illustrates a schematic diagram of interaction between the core network and the access network in the LTE system in the prior art;

FIG. 2 illustrates a schematic diagram of interaction between the core network and the access network in the UMTS system in the prior art;

FIG. 3 illustrates a schematic flow chart of a paging method at the network side according to an embodiment of the invention;

DETAILED DESCRIPTION OF THE EMBODIMENTS

Figure 4:
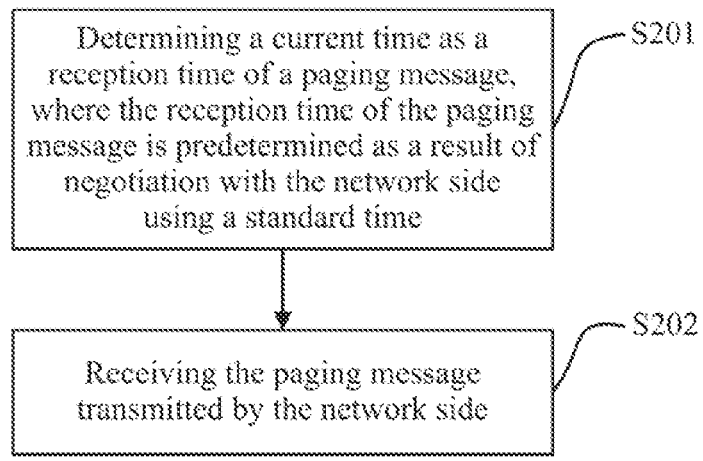
FIG. 4 illustrates a schematic flow chart of a paging method at a terminal according to an embodiment of the invention.

Embodiments of the invention provide a paging method and device at the network side and a terminal so as to avoid a paging cycle from being limited by a System Frame Number (SFN) and to configure the terminal with a longer paging cycle and save power consumption of the terminal.

Referring to FIG. 3, a paging method at the network side according to an embodiment of the invention includes:

Operation S101: determining a current time as a transmission time of a paging message, where the transmission time of the paging message is predetermined as a result of negotiation with a terminal using a standard time; and Operation S102: transmitting the paging message to the terminal.

Preferably before the transmission time of the paging message is determined as a result of negotiation with the terminal using the standard time, the method further includes transmitting a message for determining the standard time to the terminal in a preset system information block. Preferably the system information block for transmitting the standard time needs to be added in a UMTS system.

Preferably the standard time is a system time of a communication system, or a network standard time.

Preferably the transmission time of the paging message is determined as a result of negotiation with the terminal using the standard time by determining configuration parameters related to the transmission time of the paging message as a result of negotiation with the terminal using the standard time; and calculating the transmission time of the paging message from the configuration parameters.

The paging time can be determined from the standard time so that there will be a number of paging schemes, and the configuration parameters thereof can be set as follows:

Preferably the configuration parameters include a radio frame corresponding to an initiation time of the paging message, an offset of the paging message in the radio frame, and a first transmission cycle of the paging message. The paging message is transmitted periodically according to the first transmission cycle; and the terminal can determine the transmission time of the paging message accurately and receive the paging message according to the configuration parameters above and referring to the standard time.

In order to ensure reliable transmission of the paging message, paging needs to be performed for a number of times in each first transmission cycle.

Preferably the configuration parameters further include the number of times that the paging message is repeated in each first transmission cycle, and a repetition cycle of the paging message in each first transmission cycle, or the configuration parameters further include the number of times that the paging message is repeated in each first transmission cycle, where times when the paging message is transmitted repeatedly in each first transmission cycle are determined from an International Mobile Subscriber Identity (IMSI) of the terminal, and a System Frame Number (SFN), that is, the network side and the terminal determine the paging times and perform paging in each first transmission cycle as in the prior art.

Preferably the method according to the invention can be applied only if the length of the paging cycle, i.e., the first transmission cycle, goes beyond the range available in the existing protocol. That is, the first transmission cycle of the paging message is more than a preset value which is the maximum value of the paging cycle available from the existing protocol.

Referring to FIG. 4, a paging method at a terminal according to an embodiment of the invention includes:

Operation S201: determining a current time as a reception time of a paging message, where the reception time of the paging message is predetermined as a result of negotiation with the network side using a standard time; and Operation S202: receiving the paging message transmitted by the network side.

Preferably before the reception time of the paging message is determined as a result of negotiation with the network side using the standard time, the method includes receiving a message, for determining the standard time, transmitted by the network side in a preset system information block.

Preferably the standard time is a system time of a communication system, or a network standard time.

Preferably the reception time of the paging message is determined as a result of negotiation with the network side using the standard time by determining configuration parameters related to the reception time of the paging message as a result of negotiation with the network side using the standard time; and calculating the reception time of the paging message from the configuration parameters.

Preferably the configuration parameters include a radio frame corresponding to an initiation time of the paging message, an offset of the paging message in the radio frame, and a first transmission cycle of the paging message.

Preferably the configuration parameters further include the number of times that the paging message is repeated in each first transmission cycle, and a repetition cycle of the paging message in each first transmission cycle, or preferably the configuration parameters further include the number of times that the paging message is repeated in each first transmission cycle, where times when the paging message is transmitted repeatedly by the network side in each first transmission cycle are determined from an IMSI of the terminal, and an SFN.

Particular embodiments of the invention will be given below:

First Embodiment

Figure 5:
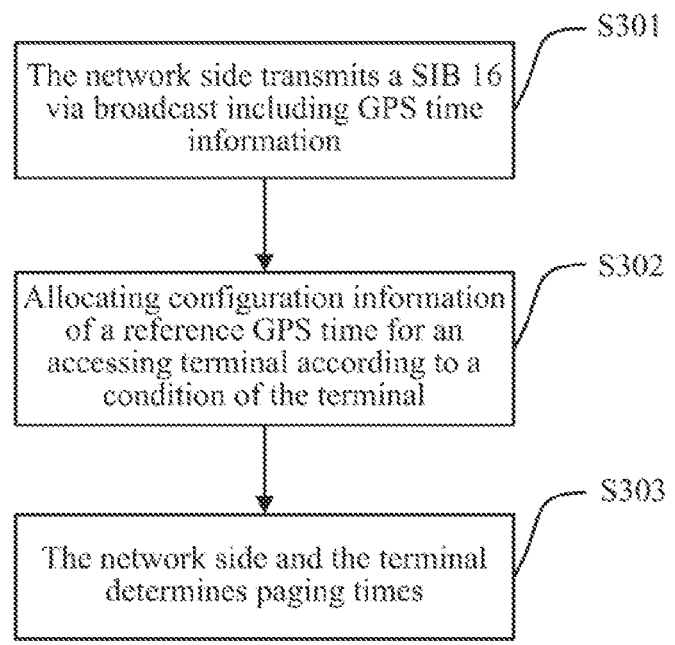
FIG. 5 illustrates a schematic flow chart of a paging method in an LTE system according to a particular embodiment of the invention.

Paging times are determined in an LTE system. As illustrated in FIG. 5, there are the following operations:

S301: The network side transmits a System Information Block SIB 16 via broadcast, where the SIB 16 includes Global Positioning System (GPS) time information;

S302: The network side allocates configuration information of a reference GPS time for an accessing terminal according to a condition of the terminal, including: specifying a radio frame at a GPS time T1 to initiate paging, an offset S in the radio frame, and a paging cycle P which is an integer multiple of a GPS time granularity; and S303: The network side and the terminal determines paging times as T1+N*P+S, where N represents integers of 0, 1, 2, . . . .

Second Embodiment

A UMTS system is adapted.

In the UMTS system, the network time is given at present only in a Multimedia Broadcast Multicast Service (MBMS) message and only applicable to the LCR TDD mode, but the system time may not be available to the other modes, so similarly, a System Information Block (SIB) can be newly defined to carry system time information as in the LTE system.

Like the first embodiment, the terminal can calculate a paging occasion from configuration information based on the system time information.

Third Embodiment an application scheme, in which internal transmission is performed via an interface at the network side.

The network side essentially consists of two device layers of a core network and an access network, where the core network manages paging configuration, and the access network transmits a paging message according to signaling of the core network. When some UE needs to be paged over the network, the Core Network (CN) node transmits a paging message to the eNB or the Radio Network Controller (RNC) to provide the access network side with detailed paging time information in addition to the identifier of the UE, and the contents of the paging message. For example a particular GPS time can be specified each time so that the access network node transmits the paging message at the specified GPS time occasion. Alternatively like the first embodiment, configuration information, configured for the UE, related to calculation of the paging time can be transmitted to the access network side so that the access network side calculates the paging time and then transmits the paging message at the corresponding occasion.

Taking an LTE system as an example, related time information, pagingGPStime (a GPS time at which paging is started), newcycle (a new paging cycle), and shift information (information about a shift in the cycle) can be added to the existing S1 interface signaling paging message; or a new paging message can be defined, e.g., New Paging, to carry the information.

Fourth Embodiment an application scheme, in which there is only one paging in each cycle, and the invention can be applied with the existing mechanism.

Since there is a paging mechanism existing in the system, in order for better coordination, the existing paging mechanism which can operate normally can be applied with a short paging cycle, that is, the occasion of paging can be determined from an IMSI/UE identifier, an SFN, paging parameters and other information. If the paging cycle goes beyond the range available in the existing mechanism, then the inventive solution can be applied to calculate the paging occasion from the system time and the related parameters.

Fifth Embodiment an application scheme, in which there is dual-cycle paging.

In order to ensure reliable transmission of a paging message, the paging message in each cycle needs to be transmitted repeatedly, that is, the core network gives two paging cycles when configuring paging related parameters. The core network configures the terminal with a time T1, a long paging cycle P1, and an offset S in a radio frame, like the example in the first embodiment, and also a short cycle P2, and the number M of times that the short cycle is repeated. The terminal listens to paging at the following times:

Paging time=$T1+P1*N+P2*K+S$

Where N represents of 0, 1, 2, . . . ; and K=0, 1, . . . , M−1.

Sixth Embodiment an application scheme, in which there is a long cycle combined with the prior art.

Like the fifth embodiment, the core network configures the terminal with parameters including a time T1, a long cycle P1, and an offset S in a radio frame, for determining a starting time at which listening to paging is started; and moreover the core network configures the terminal the number of times M that paging is listened to, but does not specify any short cycle P2. The terminal starts to listen at a starting time of each long cycle, and listens continuously in the cycle for a number M of times by adopting the method for calculating a paging time as in the prior art, and then stops listening and waits for a starting time of a next long cycle to restart paging.

Figure 6:
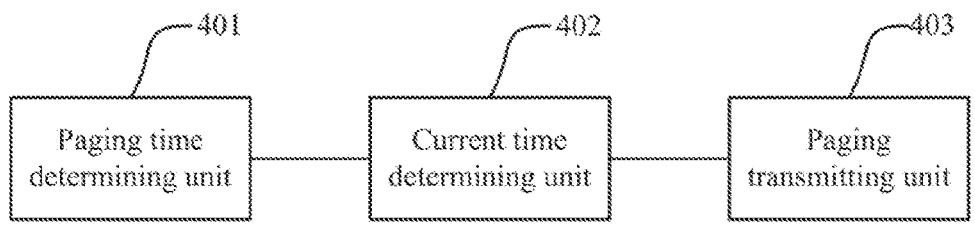
FIG. 6 illustrates a schematic structural diagram of a paging device at the network side according to an embodiment of the invention.

Referring to FIG. 6, a paging device at the network side according to an embodiment of the invention includes:

A paging time determining unit 401 is configured to predetermine a transmission time of a paging message as a result of negotiation with a terminal using a standard time;

A current time determining unit 402 is configured to determine a current time as the transmission time of the paging message; and A paging transmitting unit 403 is configured to transmit the paging message to the terminal.

Preferably the device further includes:

A standard time synchronizing unit is configured to transmit a message for determining the standard time to the terminal in a preset system information block before the paging time determining unit determines the transmission time of the paging message as a result of negotiation with the terminal using the standard time.

Preferably the standard time is a system time of a communication system, or a network standard time.

Figure 7:
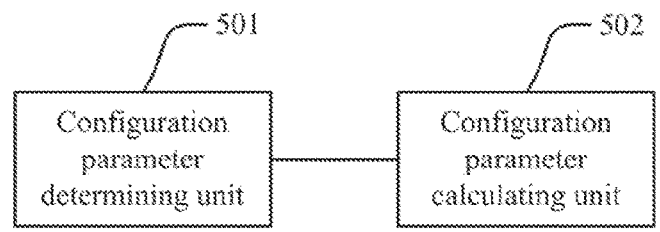
FIG. 7 illustrates another schematic structural diagram of a paging device at the network side according to an embodiment of the invention.

As illustrated in FIG. 7, preferably the paging time determining unit 401 includes:

A configuration parameter determining unit 501 is configured to determine configuration parameters related to the transmission time of the paging message as a result of negotiation with the terminal using the standard time; and A configuration parameter calculating unit 502 is configured to calculate the transmission time of the paging message from the configuration parameters.

Preferably the configuration parameters include:

A radio frame corresponding to an initiation time of the paging message, an offset of the paging message in the radio frame, and a first transmission cycle of the paging message.

Preferably the configuration parameters further include:

The number of times that the paging message is repeated in each first transmission cycle, and a repeation cycle of the paging message in each first transmission cycle.

Preferably the configuration parameters further include:

The number of times that the paging message is repeated in each first transmission cycle;

Where times when the paging message is transmitted repeatedly in each first transmission cycle are determined from an IMSI of the terminal, and an SFN.

Preferably the first transmission cycle of the paging message is more than a preset value.

An embodiment of the invention further provides a paging device at the network side, including a processor and a data transceiving interface, where:

The processor is configured to predetermine a transmission time of a paging message as a result of negotiation with a terminal using a standard time; to determine a current time as the transmission time of the paging message; and to transmit the paging message to the terminal; and The data transceiving interface is configured to be controlled by the processor to transmit and receive data.

Preferably the paging device at the network side in this embodiment is an eNB.

Figure 8:
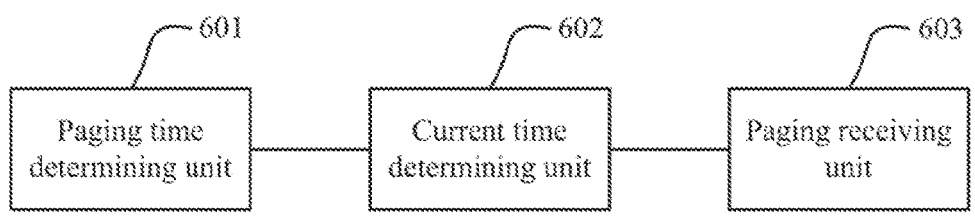
FIG. 8 illustrates a schematic structural diagram of a paging device at a terminal according to an embodiment of the invention.

Referring to FIG. 8, a paging device at a terminal according to an embodiment of the invention includes:

A paging time determining unit 601 is configured to predetermine a reception time of a paging message as a result of negotiation with the network side using a standard time;

A current time determining unit 602 is configured to determine a current time as the reception time of the paging message; and A paging receiving unit 603 is configured to receive the paging message transmitted by the network side.

Preferably the device further includes:

A standard time synchronizing unit is configured to receive a message, for determining the standard time, transmitted by the network side in a preset system information block before the paging time determining unit determines the reception time of the paging message as a result of negotiation with the network side using the standard time.

Preferably the standard time is a system time of a communication system, or a network standard time.

Preferably the paging time determining unit 601 includes:

A configuration parameter determining unit is configured to determine configuration parameters related to the reception time of the paging message as a result of negotiation with the network side using the standard time; and A configuration parameter calculating unit is configured to calculate the reception time of the paging message from the configuration parameters.

Preferably the configuration parameters include:

A radio frame corresponding to an initiation time of the paging message, an offset of the paging message in the radio frame, and a first transmission cycle of the paging message.

Preferably the configuration parameters further include:

The number of times that the paging message is repeated in each first transmission cycle, and a repeation cycle of the paging message in each first transmission cycle.

Preferably the configuration parameters further include:

The number of times that the paging message is repeated in each first transmission cycle;

Where times when the paging message is transmitted repeatedly in each first transmission cycle are determined from an IMSI of the terminal, and an SFN.

An embodiment of the invention further provides a paging device at a terminal, including a processor and a data transceiving interface, where:

The processor is configured to predetermine a reception time of a paging message as a result of negotiation with the network side using a standard time; to determine a current time as the reception time of the paging message; and to receive the paging message transmitted by the network side; and The data transceiving interface is configured to be controlled by the processor to transmit and receive data.

In summary, the embodiments of the invention provide a paging method and device at the network side and a terminal so as to avoid a paging cycle from being limited by a System Frame Number (SFN) and to configure the terminal with a longer paging cycle for the purpose of saving power of the terminal.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A paging method, comprising:
   determining, by a network side device, configuration parameters relating to a time for starting to transmit a paging message according to negotiation with a terminal using standard time, wherein the configuration parameters relating to the time for starting to transmit the paging message comprise T1, N, P1, and S, wherein T1 represents a start time of a radio frame incorporating the paging message, N represents an integer greater than −1, S represents an offset of the paging message in the radio frame, and P1 represents a transmission cycle of the paging message;
   calculating, by the network side device, the time for starting to transmit the paging message as T1+N*P1+S; and
   transmitting, by the network side device, the paging message to the terminal at the time for starting to transmit the paging message.

2. The method according to claim 1, before determining the configuration parameters relating to the time for starting to transmit the paging message further comprising:
   transmitting, by the network side device, a message for determining the standard time to the terminal in a preset system information block.

3. The paging method according to claim 1, further comprising:
   determining, by the terminal, configuration parameters relating to a time for starting to receive the paging message according to negotiation with the network side device using the standard time, wherein the configuration parameters relating to the time for starting to receive the paging message comprise T1, N, P1, and S;
   calculating, by the terminal, the time for starting to receive the paging message as T1+N*P1+S; and
   receiving the paging message transmitted by the network side device at the time for starting to receive the paging message.

4. The method according to claim 3, before determining the configuration parameters relating to the time for starting to receive the paging message, further comprising:
   receiving, by the terminal, the message, for determining the standard time, transmitted by the network side device in the preset system information block.

5. A paging device, comprising:
   a memory; and
   at least one processor;
   wherein the memory is configured to store computer readable program codes, and the at least one processor is configured to execute the computer readable program codes to perform the paging method according to claim 1.

6. The device according to claim 5, wherein the at least one processor is further configured to execute the computer readable program codes to:
transmit the message for determining the standard time to the terminal in a preset system information block before the configuration parameters relating to the time for starting to transmit the paging message is determined.

7. The method according to claim 1, wherein the standard time is a system time of a communication system, or a network standard time.

\* \* \* \* \*